United States Patent
Shudo (10) Patent No.: US 10,343,119 B2
(45) Date of Patent: Jul. 9, 2019

(54) WATER DISTILLATION SYSTEM

(71) Applicant: Honda Motor Co., Ltd., Tokyo (JP)

(72) Inventor: Shigeru Shudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/672,174

(22) Filed: Aug. 8, 2017

(65) Prior Publication Data

US 2018/0111092 A1    Apr. 26, 2018

(30) Foreign Application Priority Data

Oct. 20, 2016    (JP) ................. 2016-206001

(51) Int. Cl.
| | | |
|---|---|---|
| C02F 1/14 | (2006.01) | |
| C02F 1/44 | (2006.01) | |
| B01D 61/36 | (2006.01) | |
| B01D 1/00 | (2006.01) | |
| B01D 3/10 | (2006.01) | |
| B01D 5/00 | (2006.01) | |
| C02F 103/08 | (2006.01) | |

(52) U.S. Cl.
CPC ......... *B01D 61/362* (2013.01); *B01D 1/0035* (2013.01); *B01D 3/103* (2013.01); *B01D 5/0048* (2013.01); *B01D 5/0066* (2013.01); *C02F 1/14* (2013.01); *C02F 1/448* (2013.01); *C02F 1/44* (2013.01); *C02F 2103/08* (2013.01); *Y02A 20/128* (2018.01); *Y02A 20/212* (2018.01)

(58) Field of Classification Search
None
See application file for complete search history.

(56) References Cited

U.S. PATENT DOCUMENTS

| | | | | |
|---|---|---|---|---|
| 3,006,818 A * | 10/1961 | Lappala | ................ | B29C 53/582 |
| | | | | 202/234 |
| 3,248,307 A * | 4/1966 | Walford | .................. | C02F 1/046 |
| | | | | 203/11 |
| 4,498,959 A * | 2/1985 | Sakamoto | ............ | B01D 5/0066 |
| | | | | 202/185.2 |
| 4,504,362 A * | 3/1985 | Kruse | ....................... | C02F 1/14 |
| | | | | 203/3 |
| 6,185,940 B1 * | 2/2001 | Prueitt | ................... | B01D 61/10 |
| | | | | 60/649 |
| 2003/0209419 A1 | 11/2003 | Tonkin et al. | | |
| 2011/0203915 A1 * | 8/2011 | McClure | .............. | B01D 1/0035 |
| | | | | 203/3 |
| 2014/0305788 A1 * | 10/2014 | Matsushima | ............. | C02F 1/14 |
| | | | | 203/10 |

FOREIGN PATENT DOCUMENTS

| | | | | |
|---|---|---|---|---|
| GB | 2450486 A | * 12/2008 | .......... | B01D 1/0035 |
| JP | 2003506212 A | 2/2003 | | |

* cited by examiner

*Primary Examiner* — Jonathan M Peo
(74) *Attorney, Agent, or Firm* — Duft & Bornsen, PC (57) ABSTRACT

A water distillation system including a reservoir unit configured to reserve a second liquid of higher concentration than the first liquid; a pipe including a first end communicated with the first liquid and a second end communicated with the second liquid in the reservoir unit; a semipermeable membrane fitted on the pipe to separate the first liquid and the second liquid, so that the first liquid is mixed into the second liquid through the semipermeable membrane and led to the reservoir unit by osmotic action; and a distillation unit configured to distill the second liquid in the reservoir unit by solar energy.

10 Claims, 7 Drawing Sheets

WATER DISTILLATION SYSTEM

CROSS-REFERENCE TO RELATED APPLICATION

This application is based upon and claims the benefit of priority from Japanese Patent Application No. 2016-206001 filed on Oct. 20, 2016, the content of which is incorporated herein by reference.

BACKGROUND OF THE INVENTION

Field of the Invention

This invention relates to a water distillation system for generating distilled water from seawater or fresh water.

Description of the Related Art

Conventionally, systems have been developed that use solar energy to obtain drinking water or the like from seawater. For example, Japanese Unexamined Patent Publication No. 2003-506212 (JP2003-506212A) describes a system which has a base consisting of a hydrophilic membrane floating on a sea surface and a structure connected to the base to form a dome-like space above the base, and is adapted to generate distilled water in the dome-like space by condensing water vapor passing through the base.

However, the system described in JP2003-506212A cannot achieve efficient distillation because water vapor is generated in the dome-like space by directly evaporating seawater

SUMMARY OF THE INVENTION

An aspect of the present invention is a water distillation system for generating distilled water from a first liquid composed of seawater or fresh water, and the water distillation system includes a reservoir configured to reserve a second liquid of higher concentration than the first liquid; a pipe including a first end communicated with the first liquid and a second end communicated with the second liquid in the reservoir; a semipermeable membrane fitted on the pipe to separate the first liquid and the second liquid, so that the first liquid is mixed into the second liquid through the semipermeable membrane and led to the reservoir by osmotic action; and a distillation unit configured to distill the second liquid in the reservoir by solar energy.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

First Embodiment

Figure 1:
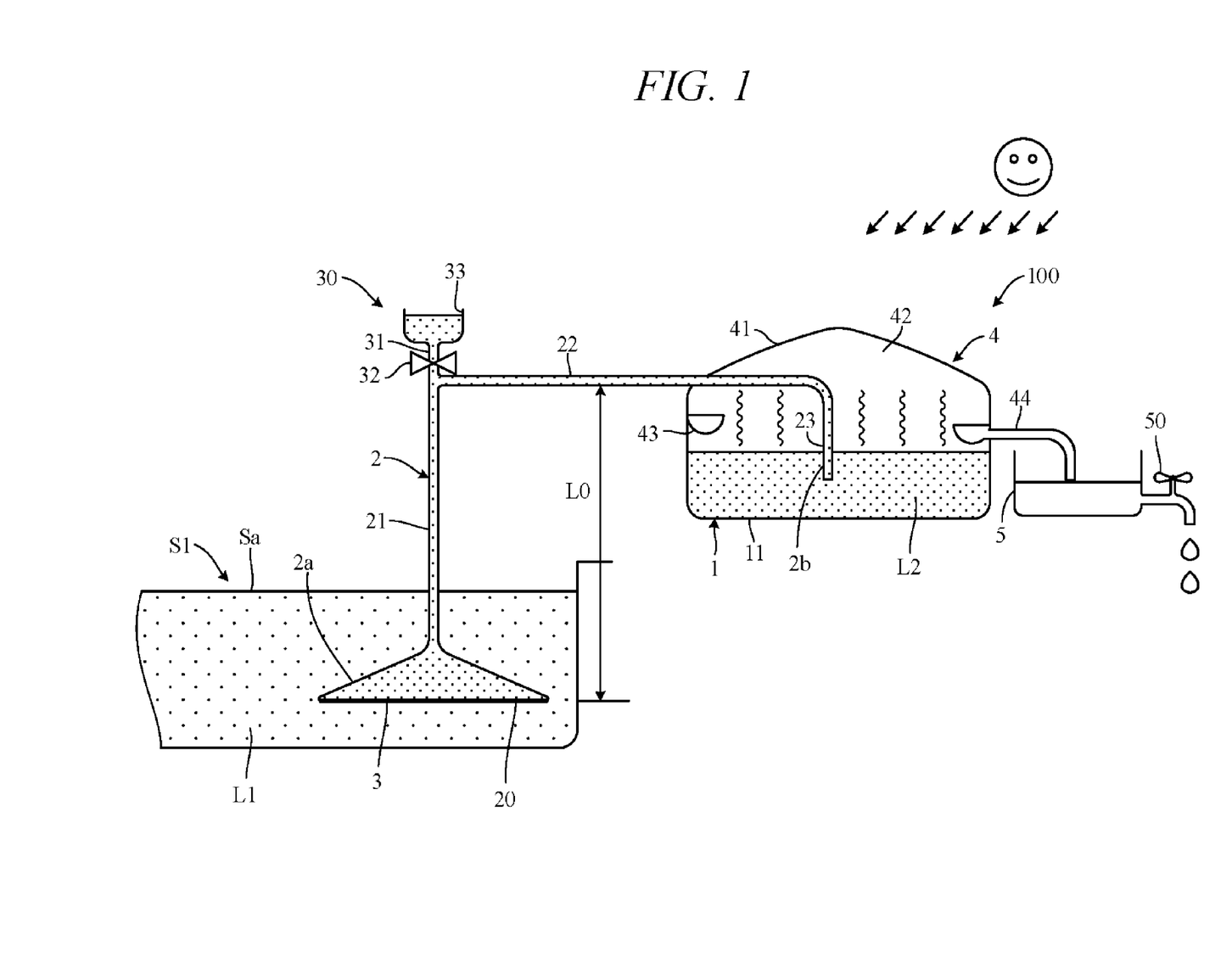
FIG. 1 is a diagram showing schematically a configuration of a water distillation system according to a first embodiment of the present invention.

Hereinafter, a first embodiment of the present invention is explained with reference to FIG. 1. FIG. 1 is a diagram showing schematically a configuration of a water distillation system according to a first embodiment of the present invention. This water distillation system is constituted to obtain distilled water from a water source, either seawater or freshwater, using solar energy. In the following, an example of obtaining distilled water from seawater is explained.

As shown in FIG. 1, a water distillation system 100 includes a reservoir unit 1 that reserves brine L2 of higher salt concentration than seawater L1, a water pipe 2 that communicates at its one end 2a with seawater L1 (sea) constituting a water source S1 and at its other end 2b with brine L2 reserved in the reservoir unit 1, a semipermeable membrane 3 fitted on the water pipe 2, and a distillation unit 4 that distills brine L2 reserved in the reservoir unit 1. The reservoir unit 1 has a tank 11 and brine L2 is reserved in the tank 11. Thus, in the first embodiment, the reservoir unit 1 (tank 11) is installed in the distillation unit 4.

The distillation unit 4 includes a dome-like shaped cover 41 installed above the tank 11 so as to cover an upside of the tank 11. The tank 11 and a cover 41 form a dome-like enclosed space 42. The reservoir unit 1 is, for example, installed outdoors on land higher than sea surface Sa. Temperature of brine L2 reserved in the reservoir unit 1 is raised by heat from solar light (solar energy) incident on an upper surface of the cover 41. The cover 41 is made of a material that efficiently transmits solar light (heat), and the tank 11 is made of a material excellent in thermal absorptivity.

As the temperature of brine L2 is raised, brine L2 evaporates into water vapor. When temperature of the enclosed space 42 falls, at night, for example, this water vapor condenses into water drops that descend along the inner wall of the cover 41. A lower edge of the cover 41 is provided with a water-drop receiving trough 43 that extends completely around the cover 41. A pipe 44 connected to the trough 43 passes distilled water accumulated in the trough 43 to a water tank 5 outside the distillation unit 4 for storage. Distilled water can be drawn from the water tank 5 through a faucet (tap) 50 and used as drinking water, for example. Since the pore diameter of the semipermeable membrane 3 is very fine, on the one-nanometer level, the drinking water does not require purification.

Thus, in the present embodiment, brine L2 is reserved in the reservoir unit 1 of finite volume provided separately from the sea serving as the water source S1. Owing to the fact that temperature increase of brine L2 is therefore greater than that of seawater L1, brine L2 can be efficiently evaporated by solar energy to achieve efficient generation of distilled water. However, this arrangement requires seawater L1, the source of brine L2, to be conveyed from the sea to the reservoir unit 1, but use of a pump or the like for this would require large-scale equipment that would increase both installation cost and running cost of the water distillation system 100. In order to reduce these costs, therefore, the present embodiment conveys seawater L1 by osmosis utilizing a semipermeable membrane 3, as explained in the following.

As seen in FIG. 1, one end 2a of the water pipe 2 is placed in the sea. The one end 2a of the water pipe 2 is shaped to enable efficient collection of permeating water, such as by diametric expansion into a conical shape, and a water intake port 20 is formed at its end face. The semipermeable membrane 3 is fitted over the entire water intake port 20. Overall, the water pipe 2 resembles an inverted letter U composed of a vertical pipe section 21 extending upward from the one end 2a, a horizontal pipe section 22 bent horizontally from the vertical pipe section 21, and a vertical pipe section 23 bent vertically from the horizontal pipe section 22. The other end 2b of the water pipe 2 (i.e., tip region of the vertical pipe section 23) is placed in brine L2 reserved in the reservoir unit 1.

A charging unit 30 for charging brine L2 into the water pipe 2 is provided on the water pipe 2. The charging unit 30 has a branch pipe 31 branching off the water pipe 2. Specifically, the branch pipe 31 is connected through a manually operable open-close valve 32 to the meeting point between the vertical pipe section 21 and the horizontal pipe section 22. A feed inlet 33 is provided at the upper end of the branch pipe 31, and brine L2 can be fed from the feed inlet 33 into water pipe 2 in accordance with opening and closing of the on-off valve 32. This makes it possible to charge brine L2 into the entire water pipe 2 and to fill the reservoir unit 1 with brine L2 supplied via the water pipe 2.

Concentration of brine L2 in the reservoir unit 1 is set higher than that of seawater L1. To give an example, concentration of brine L2 is set to around 7% so as to be about twice the concentration of seawater L1 (around 3.5%). The semipermeable membrane 3 passes ions and molecules of or smaller than a certain size. Owing to the concentration difference between seawater L1 and brine L2, water (solvent) after removal of salt (solute) from seawater L1 permeates the semipermeable membrane 3 and moves into the water pipe 2 (osmosis) to become a component of brine L2. As a result, brine L2 flows from the one end 2a to the other end 2b of the water pipe 2 and from the other end 2b into the reservoir unit 1.

Concentration difference between seawater L1 and brine L2 produces osmotic pressure in the water pipe 2. Height L0 from the one end 2a to highest level of the water pipe 2 (at horizontal pipe section 22) is set shorter than height difference between seawater L1 and brine L2 surface levels produced by the osmotic pressure (e.g., height difference between their surface levels occurring when the U-shaped pipe contains both seawater L1 permeating through the semipermeable membrane and brine L2). As a result, seawater L1 (strictly speaking, a component of seawater L1 that permeate through the semipermeable membrane 3, i.e., water) can rise against the force of gravity the horizontal pipe section 22, whereby seawater L1 can be conveyed to the reservoir unit 1 located at a higher level than the sea surface Sa.

Now follows an explanation of an example of operation of the water distillation system 100 according to the first embodiment of the present invention. As shown in FIG. 1, in a state where the water pipe 2 is filled with brine L2 of higher concentration than seawater L1, osmosis causes a component of seawater L1 to pass through the semipermeable membrane 3 of the water intake port 20 and flow into the water pipe 2 to become brine L2. As a result, brine L2 in the water pipe 2 is conveyed to the reservoir unit 1. Brine L2 in the reservoir unit 1 (distillation unit 4) is evaporated into water vapor by solar energy (heat). This water vapor condenses into water drops that pass down the inner wall of the cover 41 into the trough 43. Further, the water drops flow from the trough 43 through the pipe 44 into the water tank 5, and are reserved in the water tank 5.

In this embodiment, water contained in seawater L1 flows through the semipermeable membrane 3 into the water pipe 2 while a corresponding amount of water is being evaporated in the reservoir unit 1. This effectively maintains concentration of brine L2 in the water pipe 2 substantially constant. Seawater L1 can therefore be continuously conveyed to the reservoir unit 1. A result of the foregoing is that seawater L1 can be efficiently distilled and desalinated using only natural energy, without utilizing power of a pump or the like to draw up seawater L1.

The first embodiment of the present invention can achieve advantages and effects such as the following:

(1) The water distillation system 100 includes the reservoir unit 1 that reserves brine L2 of higher salt concentration than seawater L1, the water pipe 2 that includes one end communicated with seawater L1 constituting the water source S1 and the other end communicated with brine L2 in the reservoir unit 1, the semipermeable membrane 3 fitted on the water pipe 2 to separate seawater L1 and brine L2 so that a component of seawater L1 is mixed into brine L2 through the semipermeable membrane 3 and led to the reservoir unit 1 by osmotic action, and the distillation unit 4 that uses solar energy to distill brine L2 in the reservoir unit 1 (FIG. 1). Therefore, seawater L1 that permeates the semipermeable membrane 3 (brine L2) can be conveyed to the reservoir unit 1 and distilled by the distillation unit 4 without using power of a pump. As a result, liquid (brine L2) can be more efficiently evaporated and more efficiently distilled than in the case of evaporating seawater L1 on the sea.

(2) The distillation unit 4 includes the tank 11 and cover 41 that define the enclosed space 42, and the trough 43 that collects distilled water obtained by distillation of brine L2 evaporated in the enclosed space 42 (FIG. 1). As a result, distilled water can be obtained from brine L2 by the distillation unit 4 without utilizing power of a pump or the like.

(3) The enclosed space 42 is formed so as to cover an upside of the reservoir unit 1 (tank 11) (FIG. 1). Therefore, since distillation can be performed at the reservoir unit 1, a simple system configuration is possible because the distillation unit 4 need not be installed separately from the reservoir unit 1.

(4) The water distillation system 100 is additionally equipped with the charging unit 30 for charging brine L2 into the water pipe 2 at a point toward the reservoir unit 1 from the semipermeable membrane 3 (FIG. 1). Since this enables the water pipe 2 to be constantly filled with brine L2, osmotic action can be continuously realized in the water pipe 2.

(5) The charging unit 30 includes the branch pipe 31 branched off from the water pipe 2 at a point toward the reservoir unit 1 from the semipermeable membrane 3 for supplying brine L2 to the water pipe 2, and the open-close valve 32 for regulating the amount of brine L2 supplied to the water pipe 2 from the branch pipe 31 (FIG. 1). Therefore, since the amount of brine L2 charged into the water pipe 2 is controllable, concentration of brine L2 in the water pipe 2 is easy to adjust.

Second Embodiment

Figure 2:
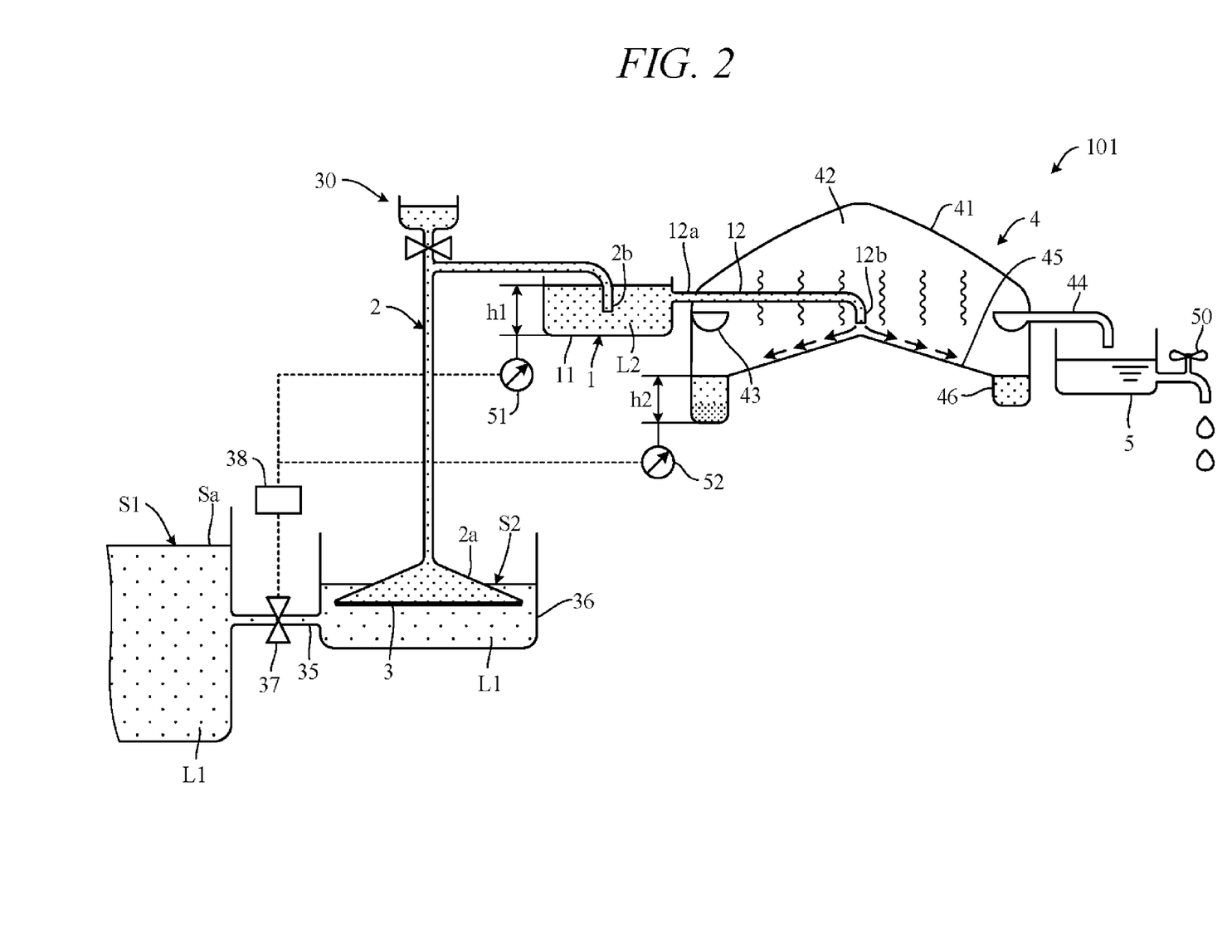
FIG. 2 is a diagram showing schematically a configuration of a water distillation system according to a second embodiment of the present invention.

A second embodiment of the present invention is explained with reference to FIGS. 2 and 3 in the following. In the second embodiment, unlike in the first embodiment, a distillation unit 4 is provided separately from a reservoir unit 1. FIG. 2 is a diagram showing schematically a configuration of a water distillation system 101 according to the second embodiment of the present invention. Members in common with those of FIG. 1 are assigned like reference symbols and the ensuing explanation is focused mainly on points of difference from the first embodiment.

As seen in FIG. 2, a water receiving tank 36 is connected to a sea through a pipe 35. An open-close valve 37 is provided in the pipe 35 and seawater L1 is supplied to the water receiving tank 36 in accordance with degree of opening and closing of the open-close valve 37. One end 2a of a water pipe 2 fitted with a semipermeable membrane 3 is communicated with seawater L1 of the water receiving tank 36. The water receiving tank 36 is filled to a suitable level with seawater L1 in accordance with opening position of the open-close valve 37, and seawater L1 of the water receiving tank 36 is used as a water source S2 downstream of a water source S1.

Another end 2b of the water pipe 2 communicates with brine L2 reserved in a reservoir unit 1. As a result, seawater L1 of the water receiving tank 36 is conveyed by osmotic action through the semipermeable membrane 3 to the reservoir unit 1, which is installed at a location higher than sea surface Sa. The reservoir unit 1 includes a tank 11 and a pipe 12 extending substantially horizontally from a side wall of the tank 11. The pipe 12 communicates at one end 12a with brine L2 inside the tank 11.

The distillation unit 4 has a floor formed as a vertically sloped surface 45 like a conical surface. The sloped surface 45 is made black, for example, to enhance its solar light absorption efficiency. The inclined surface 45 is preferably formed of a material excellent in thermal energy storage. Another end 12b of the pipe 12 is located above the apex of the inclined surface 45 at the middle of an enclosed space 42. Brine L2 can therefore be supplied through the pipe 12 into the enclosed space 42 from above the inclined surface 45.

Evaporation of brine L2 is promoted by absorption of solar energy while brine L2 supplied to the enclosed space 42 flows downward along the inclined surface 45. The distillation unit 4 can therefor produce distilled water by condensing water vapor in the enclosed space 42 resulting from this evaporation. A lower extremity of the inclined surface 45 is formed with a trough 46 that extends completely around the inclined surface 45, and brine L2 flowing to the outer circumferential region without evaporating from the inclined surface 45 is collected in the trough 46.

Figure 3:
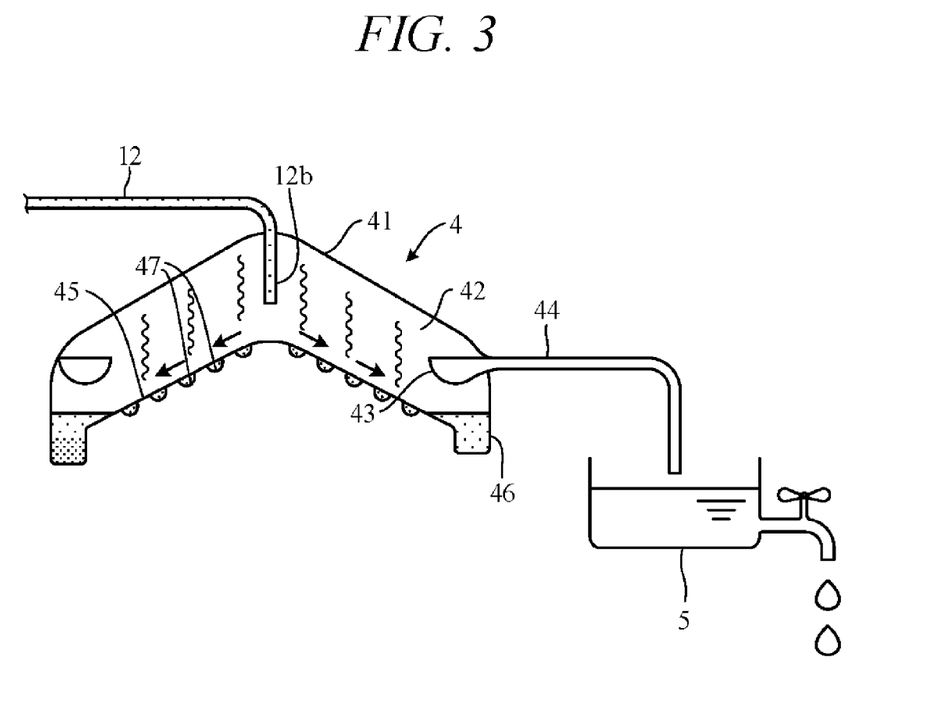
FIG. 3 is a diagram showing a modification of a distillation unit in FIG. 2.

FIG. 3 is a diagram showing a modification of the distillation unit 4 of FIG. 2. Although in the case of FIG. 2, the pipe 12 penetrates through a cover 41 and extends horizontally within the enclosed space 42, in the modification shown in FIG. 3, the pipe 12 penetrates and projects downward from an uppermost region of the cover 41. Moreover, the sloped surface 45 shown in FIG. 3 is, for example, given the curvature of a half-parabola laid sideways, so that its inclination angle to the horizontal surface increases gradually from top to bottom. In addition, the sloped surface 45 is formed from top to bottom with a helical groove 47 for passing brine L2. This elongates flow path of brine L2 on the sloped surface 45. Since inclination angle of the sloped surface 45 grows progressively gentle toward the top, brine L2 flows slowly at the upper region of the sloped surface 45. This configuration more strongly promotes evaporation of brine L2.

As shown in FIG. 2, the water distillation system 101 includes a water gauge 51 that detects level h1 of brine L2 in the reservoir unit 1 and a water gauge 52 that detects level h2 of brine L2 collected in the trough 46 of the distillation unit 4. The open-close valve 37 is an electromagnetic open-close valve whose open-close operation is controlled by a controller 38. More specifically, the controller 38 controls the open-close valve 37 to adjust the amount of seawater L1 supplied to the water receiving tank 36 from the sea so that the levels h1 and h2 detected by the water gauges 51 and 52 do not exceed respective predetermined ranges. This prevents overflow of brine L2 from the reservoir unit 1 and distillation unit 4.

In addition to the advantages and effects of the first invention, the second embodiment of the present embodiment can achieve advantages and effects such as the following:

(1) The distillation unit 4 includes the vertically sloped surface 45 at the bottom surface of the enclosed space 42 (FIG. 2). And the water distillation system 101 is additionally equipped with the pipe 12 that has one end in communication with brine L2 in the reservoir unit 1, has another end located above the sloped surface 45, and leads brine L2 into the enclosed space 42 from an upside of the sloped surface 45 (FIG. 2). Therefore, evaporation of brine L2 in the distillation unit 4 can be promoted because brine L2 is made to flow along the sloped surface 45.

(2) The water distillation system 101 is additionally equipped with the water receiving tank 36 for reserving seawater L1 led through the pipe 35 and the open-close valve 37 installed in the pipe 35 for regulating the amount of seawater L1 supplied to the water receiving tank 36, and the one end 2a of the water pipe 2 is communicated with seawater L1 in the water receiving tank 36 (FIG. 2). Therefore, the amount of seawater L1 reserved in the water receiving tank 36 can be adjusted, and thus overflow of brine L2 from the reservoir unit 1 and distillation unit 4 downstream of the water receiving tank 36 can be prevented.

Figure 4:
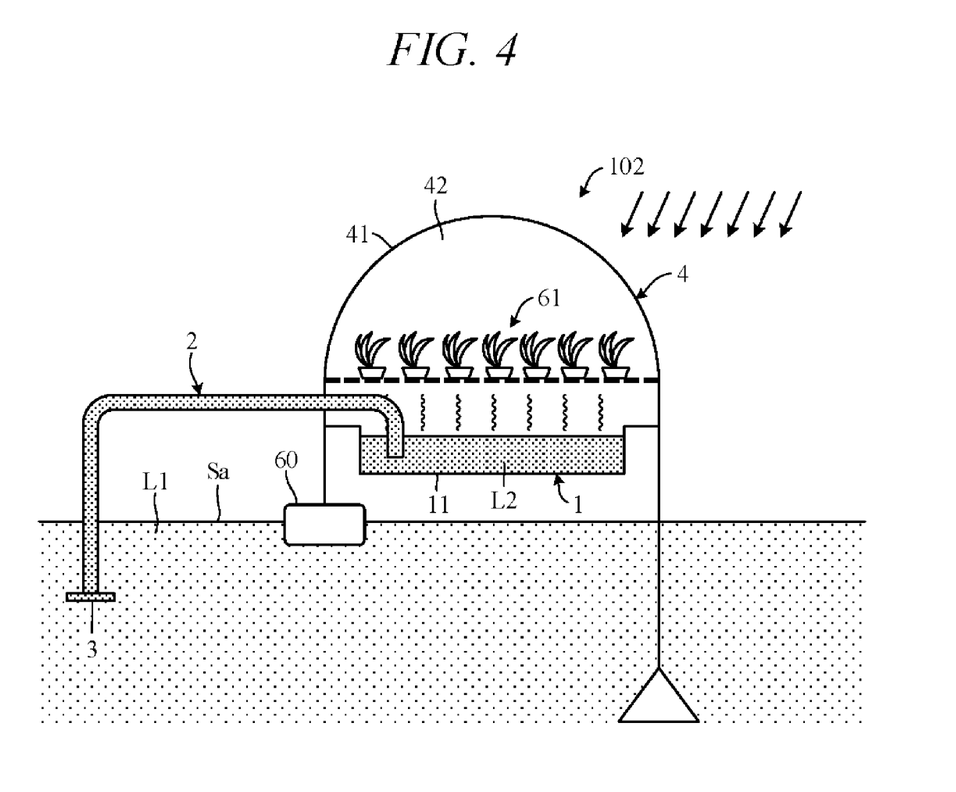
FIG. 4 is a diagram showing schematically a configuration of a water distillation system according to a first modification of the present invention.

The present invention is not limited to the above embodiments and can be modified in various aspects. Modifications (other embodiments) are explained in the following. FIG. 4 is a diagram showing schematically a configuration of a water distillation system 102 according a first modification of the present invention. Illustration of the charging unit 30 connected to the water pipe 2 (see FIG. 1) is omitted in FIG. 4. In the first modification, as shown in FIG. 4, the reservoir unit 1 and distillation unit 4 are installed above the sea surface Sa on a float 60, and the reservoir unit 1 is moored by anchors. Plants 61, for example, are placed in the enclosed space 42. By this arrangement, the plants 61 can be grown using water vapor generated by evaporating brine L2.

Figure 5:
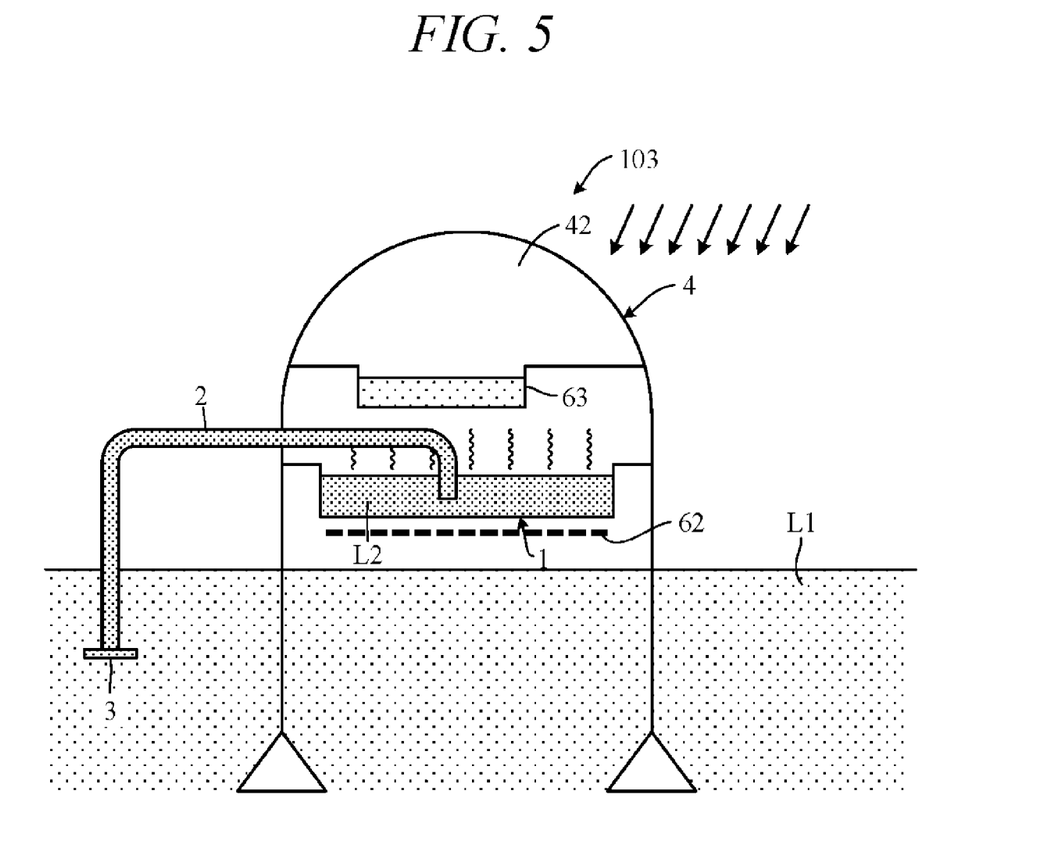
FIG. 5 is a diagram showing schematically a configuration of a water distillation system according to a second modification of the present invention.

FIG. 5 is a diagram showing schematically a configuration of a water distillation system 103 according a second modification of the present invention. As in FIG. 4, illustration of the charging unit 30 connected to the water pipe 2 is also omitted in FIG. 5. In the second modification, as shown in FIG. 5, a solar panel 62 is installed under the reservoir unit 1. This arrangement enables generation of electricity from solar energy and heating of brine L2 in the reservoir unit 1 by heat from the solar panel 62. As illustrated in FIG. 5, a water receiving tank 63 is installed in the middle of the enclosed space 42 and distilled water is collected in the water receiving tank 63.

Figure 6:
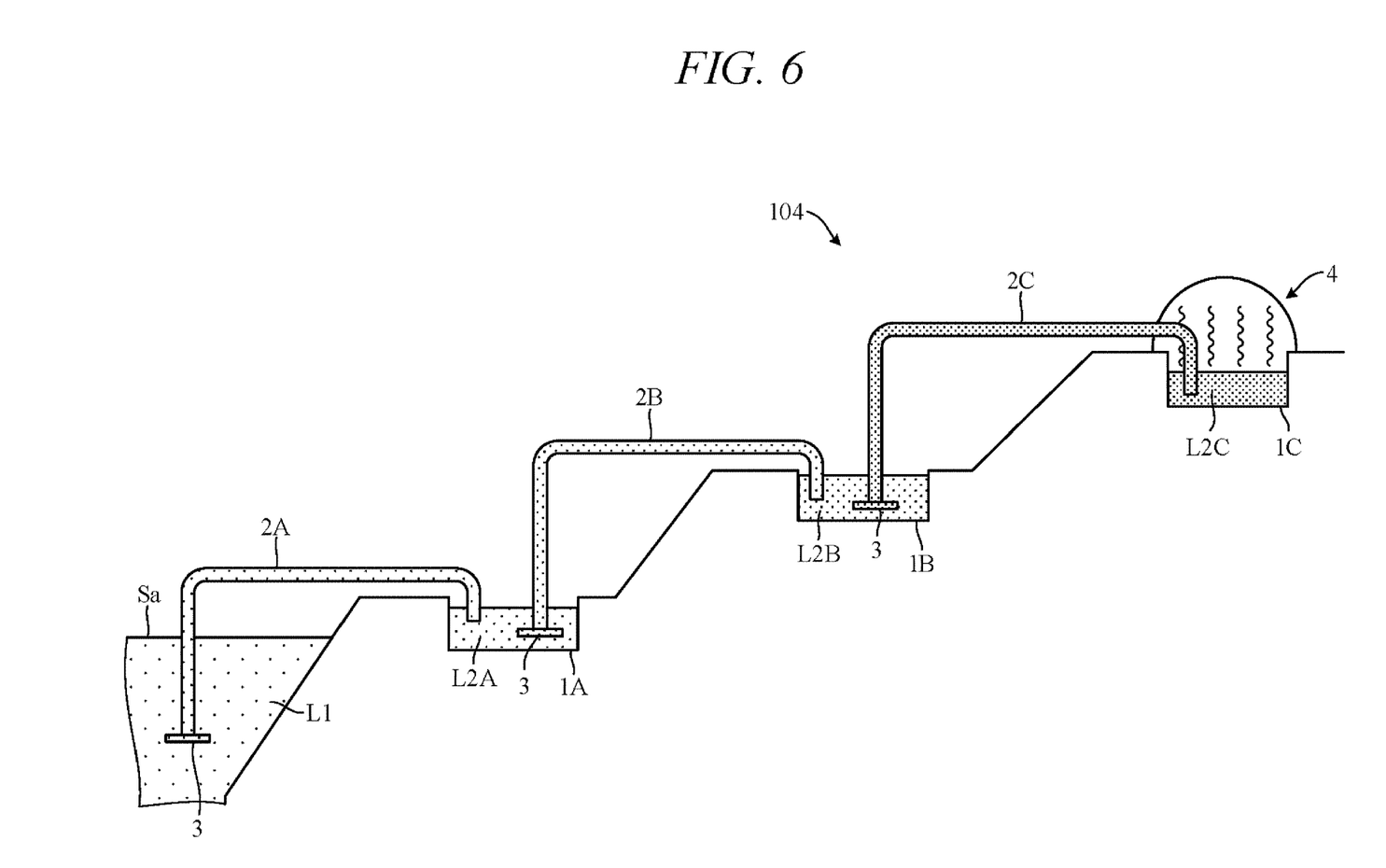
FIG. 6 is a diagram showing schematically a configuration of a water distillation system according to a third modification of the present invention.

FIG. 6 is a diagram showing schematically a configuration of a water distillation system 104 according a third modification of the present invention. As shown in FIG. 6, multiple reservoir units 1 (first reservoir unit 1A, second reservoir unit 1B, and third reservoir unit 1C) are provided and multiple water pipes 2 (first water pipe 2A, second water pipe 2B, and third water pipe 2C) are provided in association therewith. As in FIG. 4, illustration of the charging unit 30 connected to each water pipe 2 is also omitted in FIG. 6. The first reservoir unit 1A is positioned higher than the sea surface Sa, the second reservoir unit 1B is positioned higher than the first reservoir unit 1A, and the third reservoir unit 1C is positioned higher than the second reservoir unit 1B. The distillation unit 4 is installed at the third reservoir unit 1C.

The first water pipe 2A and first reservoir unit 1A are filled with first brine L2A of higher concentration than seawater L1, the second water pipe 2B and second reservoir unit 1B are filled with second brine L2B of higher concentration than first brine L2A, and the third water pipe 2C and third reservoir unit 1C are filled with third brine L2C of higher concentration than second brine L2B. Owing to this arrangement, seawater L1 can be successively conveyed to the first reservoir unit 1A, second reservoir unit 1B, and third reservoir unit 1C. Therefore, the distillation unit 4 can be installed at elevated location such as on a mountain or hill, and distilled water can be readily produced at high altitude.

Figure 7:
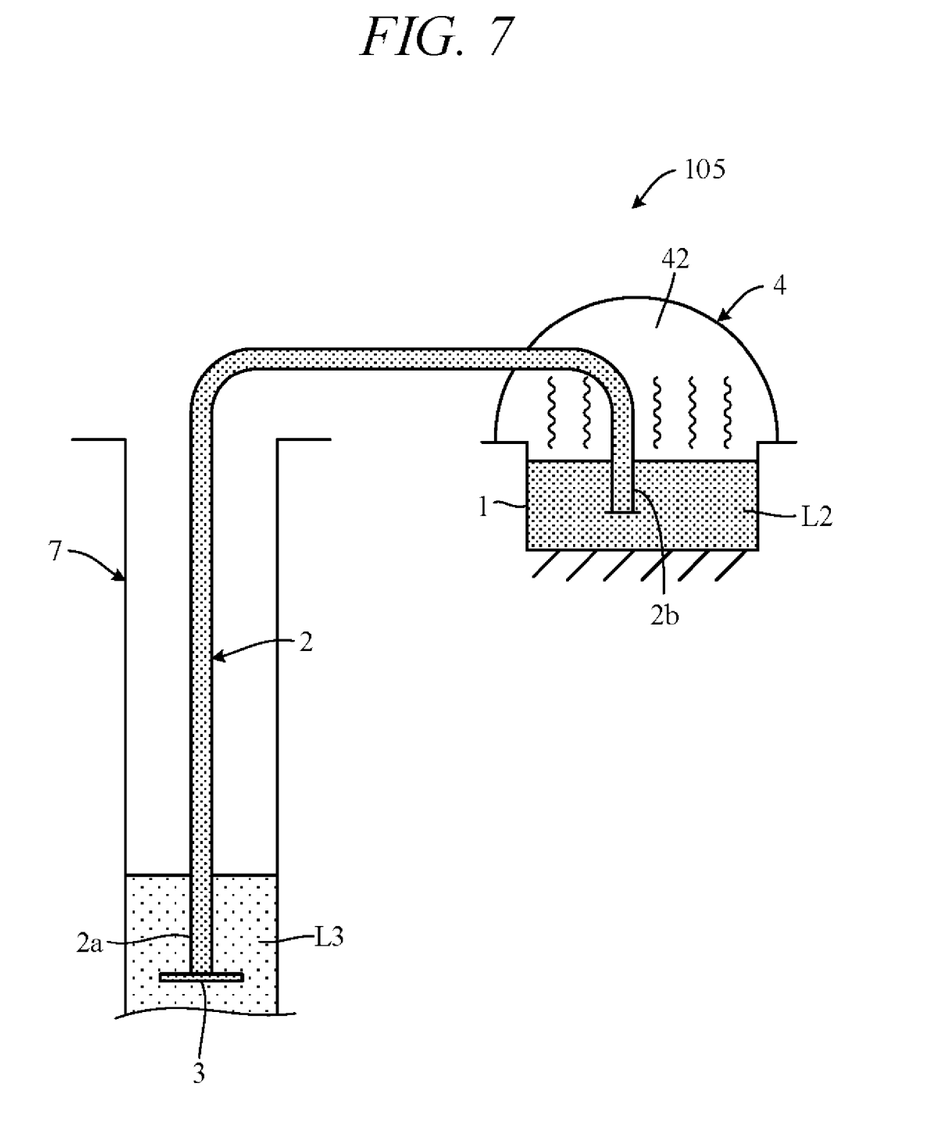
FIG. 7 is a diagram showing schematically a configuration of a water distillation system according to a fourth modification of the present invention.

Although the above embodiments are explained for the case of distilling seawater L1, they can also be applied to distillation of fresh water such as river water or underground water. In other words, the first liquid can be fresh water instead of seawater. FIG. 7 is a diagram showing schematically a configuration of a water distillation system 105 according a fourth modification of the present invention, i.e., a diagram showing an example of distilling well water as the first liquid. Illustration of the charging unit 30 connected to the water pipe 2 (see FIG. 1) is omitted in FIG. 7. As shown in FIG. 7, the first end 2a of the water pipe 2 fitted with the semipermeable membrane 3 communicates with well water L3 of a well 7, and the other end 2b communicates with brine L2 (second liquid, reserved in the reservoir unit 1) of higher concentration than well water L3. Therefore, well water L3 permeates the semipermeable membrane 3 and advances through the water pipe 2, and thus distilled water can be produced from brine L2 obtained from well water L3 as a water source.

Although seawater L1 or well water L3 communicates with brine L2 through the water pipe 2 in the above embodiments and modifications, the water pipe 2 serving as a pipe can be of any structure insofar as its one end communicates with a first liquid (seawater L1, well water L3 or the like) of a sea, river, well or the like and its other end communicates with a second liquid (brine L2) of the reservoir unit 1. Although the semipermeable membrane 3 is fitted on the one end 2a of the water pipe 2 in the above embodiments, the fitted location of the semipermeable membrane 3 is not limited to this, and insofar as the semipermeable membrane is immersed in the first liquid, it can, for example, be fitted at intermediate portion of the water pipe 2. Although the enclosed space 42 in which brine L2 evaporates is formed using the dome-like cover in the above embodiments, the enclosed space forming structure is not limited to this configuration. Although the trough 43 is provided inside the inner wall of the cover 41 in the aforesaid embodiments, the structure of a water collection unit for collecting distilled water produced by evaporating second liquid is not limited to this.

Although the other end of the pipe 12, whose one end communicates with brine L2 of the reservoir unit 1, is positioned above the sloped surface 45 in the above embodiments (FIG. 2), the configuration of a second liquid leading pipe for leading second liquid to the enclosed space is not limited to this. Although seawater L1 supplied through the pipe 35 (water intake pipe) is reserved in the water receiving tank 36 in the above embodiments (FIG. 2), the configuration of a first liquid reservoir unit is not limited to this. The structure of the open-close valve 37 installed in the pipe 35 to serve as a supply regulating unit can be of any configuration. Although in the above embodiments, the charging unit 30 is installed that comprises the branch pipe 31 (branch pipe) branched off the water pipe 2 and the open-close valve 32 (charge regulating unit) for regulating an amount of brine L2 supplied to the water pipe 2 from the branch pipe 31, the configuration of a second liquid charging unit is not limited to this.

The above embodiment can be combined as desired with one or more of the above modifications.

According to the present invention, since a first liquid is communicated with a second liquid of higher concentration than the first liquid through a pipe with a semipermeable membrane, a flow to a reservoir unit through the pipe is generated by osmotic action, and thus it is possible to efficiently generate distilled water using the first liquid as a water source.

Above, while the present invention has been described with reference to the preferred embodiments thereof, it will be understood, by those skilled in the art, that various changes and modifications may be made thereto without departing from the scope of the appended claims.

What is claimed is:
1. A water distillation system, comprising:
a reservoir unit configured to reserve a second liquid of higher concentration than a first liquid composed of seawater or fresh water, and installed so that a liquid surface level of the second liquid is higher than a liquid surface level of the first liquid;
a pipe including a first end communicated with the first liquid, a second end communicated with the second liquid in the reservoir unit, and a vertical pipe section extending upward from the first end to a highest level of the pipe;
a semipermeable membrane fitted on the first end of the pipe to separate the first liquid and the second liquid so that water in the first liquid permeates to be mixed into the second liquid through the semipermeable membrane and led to the reservoir unit against gravity by an osmotic pressure produced in the pipe by a concentration difference between the first liquid and the second liquid;
a distillation unit configured to distill water in the second liquid in the reservoir unit by solar energy; and
a second liquid charging unit connected to a highest point of the vertical pipe section through a valve and configured to charge the second liquid into the pipe at a point toward the reservoir unit from the semipermeable membrane, wherein
a height of the vertical pipe section is set shorter than a liquid surface level corresponding to the osmotic pressure produced in the pipe by the concentration difference between the first liquid and the second liquid.

2. The water distillation system according to claim 1, wherein the distillation unit comprises an enclosed space forming structure configured to form an enclosed space and a water collection unit configured to collect distilled water generated by evaporation of the second liquid in the enclosed space.

3. The water distillation system according to claim 2, wherein the enclosed space is formed so as to cover an upside of the reservoir unit.

4. The water distillation system according to claim 2, wherein the enclosed space forming structure comprises a vertically sloped surface at a bottom surface thereof, and
the water distillation system further comprises a second liquid leading pipe including a first end communicated with the second liquid in the reservoir unit and a second end located above the sloped surface to lead the second liquid into the enclosed space from an upside of the sloped surface.

5. The water distillation system according to claim 4, wherein the sloped surface is formed into a conical surface and formed with a helical groove.

6. The water distillation system according to claim 4, wherein the sloped surface is formed into a conical surface, and
the enclosed space forming structure includes a groove around the sloped surface at a bottom thereof.

7. The water distillation system according to claim 1, further comprising:
a water intake pipe;
a first liquid reservoir unit configured to reserve the first liquid led through the water intake pipe; and
a supply regulating unit provided at the water intake pipe to regulate a supply amount of the first liquid to the first liquid reservoir unit,
wherein the first end of the pipe is communicated with the first liquid in the first liquid reservoir unit.

8. The water distillation system according to claim 7, further comprising:
a water gauge configured to detect water level of the second liquid in the reservoir unit; and
a controller configured to control the supply regulating unit in accordance with the water level detected by the water gauge.

9. The water distillation system according to claim 1, wherein the second liquid charging unit comprises a branch pipe branched off from the pipe at the point to supply the second liquid to the pipe, and a charge regulating unit configured to regulate an amount of the second liquid supplied to the pipe from the branch pipe.

10. A water distillation method, comprising:
reserving a second liquid of higher concentration than a first liquid composed of seawater or fresh water in a reservoir unit installed so that a liquid surface level of the second liquid is higher than a liquid surface level of the first liquid;
communicating a first end of a pipe with the first liquid and a second end of the pipe with the second liquid in the reservoir unit through a vertical pipe section extending upward from the first end to a highest level of the pipe;
fitting a semipermeable membrane on the first end of the pipe to separate the first liquid and the second liquid, so that water in the first liquid permeates to be mixed into the second liquid through the semipermeable membrane and led to the reservoir unit against gravity by an osmotic pressure produced in the pipe by a concentration difference between the first liquid and the second liquid;
distilling water in the second liquid in the reservoir unit by solar energy;
charging the second liquid into the pipe at a highest point of the vertical pipe section toward the reservoir unit from the semipermeable membrane through a valve; and
setting a height of the vertical pipe section shorter than a liquid surface level corresponding to the osmotic pressure produced in the pipe by the concentration difference between the first liquid and the second liquid.

* * * * *